(12) United States Patent
Ivie (10) Patent No.: US 7,344,099 B1
(45) Date of Patent: Mar. 18, 2008

(54) DRAG SYSTEM FOR A SPINNING REEL

(75) Inventor: Cameron R. Ivie, Lake Park, IA (US)

(73) Assignee: Pure Fishing, Inc., Spirit Lake, IA (US)

( * ) Notice: Subject to any disclaimer, the term of this patent is extended or adjusted under 35 U.S.C. 154(b) by 0 days.

(21) Appl. No.: 11/559,720

(22) Filed: Nov. 14, 2006

(51) Int. Cl.
*A01K 89/01* (2006.01)

(52) U.S. Cl. .................................. 242/246

(58) Field of Classification Search .......... 242/244, 242/246
See application file for complete search history.

(56) References Cited

U.S. PATENT DOCUMENTS

| | | | | |
|---|---|---|---|---|
| 5,322,238 | A * | 6/1994 | Hitomi | 242/246 |
| 5,328,127 | A * | 7/1994 | Yoshikawa | 242/246 |
| 5,605,299 | A | 2/1997 | Henriksson | |
| 5,947,400 | A * | 9/1999 | Tsutsumi | 242/322 |
| 6,149,089 | A * | 11/2000 | Matsuda | 242/319 |
| 6,318,655 | B1 * | 11/2001 | Henze | 242/244 |
| 6,394,379 | B1 | 5/2002 | Ivie | |
| 6,598,819 | B2 * | 7/2003 | Furomoto | 242/319 |
| 6,641,069 | B2 * | 11/2003 | Katayama et al. | 242/246 |

* cited by examiner

Primary Examiner—Emmanuel M Marcelo
(74) Attorney, Agent, or Firm—Roylance, Abrams, Berdo & Goodman, L.L.P.

(57) ABSTRACT

A drag mechanism for a spinning reel for providing frictional resistance to the rotation of the spool of a spinning reel. The spinning reel includes a body having a rotor assembly coupled to the main body for rotating about a central axis. A crank handle is connected to the body for rotating the rotor assembly and oscillating a spindle passing through the rotor assembly. A spool assembly is disposed upon the spindle and defined by engageable structural features on the interior surface of a drag stack chamber to couple with spool washers having correspondingly matable engagement features. A drag knob assembly is connected to the spool assembly opposite the rotor assembly for controlling axial friction forces within the drag stack chamber and counter-rotation friction of the spool relative to the spindle. At least one spool washer is fixedly attached to the spool to provide a drag system for spinning reels that is more effective and with greater control.

14 Claims, 7 Drawing Sheets

DRAG SYSTEM FOR A SPINNING REEL

FIELD OF THE INVENTION

The present invention relates to a drag system capable of providing frictional resistance to the rotation of the spool of a spinning reel. More particularly, the invention relates to a fishing reel having an oscillating spool whose rotation with respect to a spindle is frictionally retarded by a drag system.

BACKGROUND OF THE INVENTION

Conventional spinning reels used for fishing generally include a body, a rotatable crank handle extending from the body, and a rotor assembly rotatably supported on the body and geared to the crank handle. When the rotor is turned, the line is retrieved and wrapped around a line wrapping section of a spool mounted to a spindle that protrudes through the rotor assembly. To protect the line from excessive tension forces from a strong or determined fish (or other high tension loads), the spinning reel is equipped with a drag system which frictionally retards the rotation of the spool relative to the rotor assembly unless a certain minimum level of tension is exerted along the fishing line.

The line storage spool is often made of a structural metal or plastic material that resists corrosion in wet environments. In general, a spool has a forward flange end, a centrally located line reservoir section of reduced outside diameter that stores a fishing line wound thereupon, and a rearward flange and skirt that protect the gears and bearing surface under the spool from direct contact with water. The spool also has a central passageway from front to back along the rotational axis for interacting with the reel spindle. Because this lateral wall of this central passageway is structural from the front flange to the rear flange, it is used as a load carrying member for the reel drag system. (It will be understood by those in the art that directional references to "front" and "rear" are in relation to the orientation of the fishing reel when used for fishing in a traditional manner.)

A series of frictionally adjustable drag washers and metallic spindle washers are often found in a drag stack chamber that is located at least partially within the line reservoir section of the spool. A bottom floor of this chamber is substantially coplanar with the forward end of the spool skirt and the back of the line reservoir section. A centerline hole or opening therein is intended to allow the reel spindle to protrude through up the centerline of the spool and into engagement with a drag adjustment knob located on the front of the spool.

The use of a rectangular, triangular or other noncircular spindle shaft and a corresponding opening in one or more of the metallic spindle washers allows rotational force from the spindle to be imparted to the spindle washers. By friction against the drag washers and one or more spool washers that are configured or keyed to interact structurally with the spool but not directly with the spindle, rotation of the spindle causes the spool to rotate.

A drag knob is provided at the front of the spool with a threaded connection to the end of the spindle. By turning to the drag knob to exert a compressive force on the drag washers and spool, the amount of frictional force applied to the spool can be adjusted. See U.S. Pat. Nos. 5,605,299 and 6,394,379, the disclosures of which are herein incorporated by reference. See also, FIGS. 1 and 2.

Figure 1:
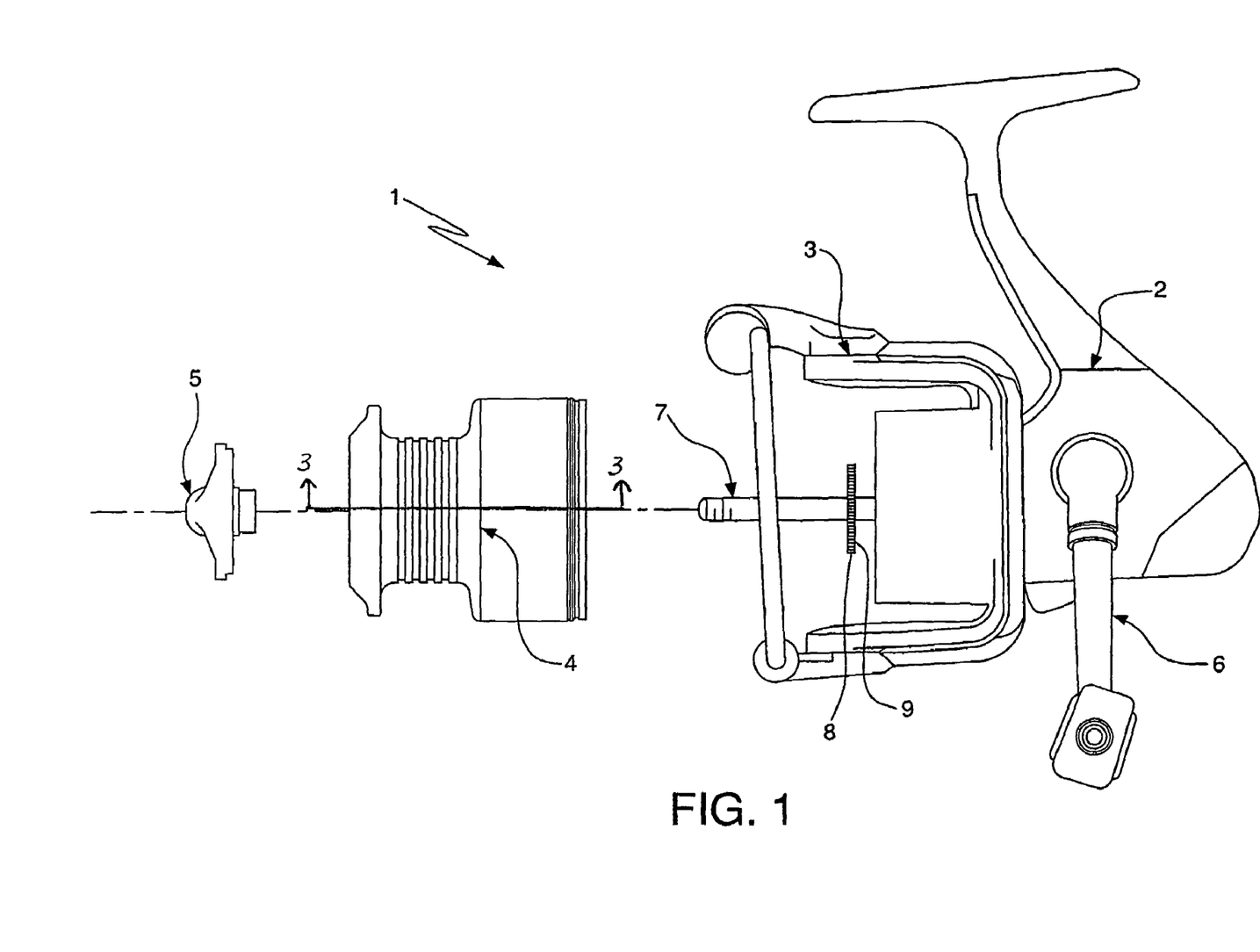
FIG. 1 is a side, perspective view of an exploded version of the spinning reel.

FIG. 1 illustrates conventional spinning reel 1 that comprises body 2, rotor 3, spool 4, drag knob 5, and crank 6 that is geared to drive spindle 7 in an oscillatory motion while rotor 3 revolves around spool 4 to wind fishing line (not shown) onto spool 4 in an even distribution pattern.

Star wheel 8 is axially supported on spindle 7 by shoulder 9 formed in spindle 7. The cross sectional shape of spindle 7 forward of shoulder 9 (i.e., toward drag knob 5) exhibits a noncircular cross sectional shape that can structurally engage star wheel 8 to prevent relative rotation of star wheel 8 relative to spindle 7. Star wheel 8 is associated with a spring-loaded pawl 22 that will emit an audible clicking sound when spool 4 rotates relative to spindle 7.

Figure 2:
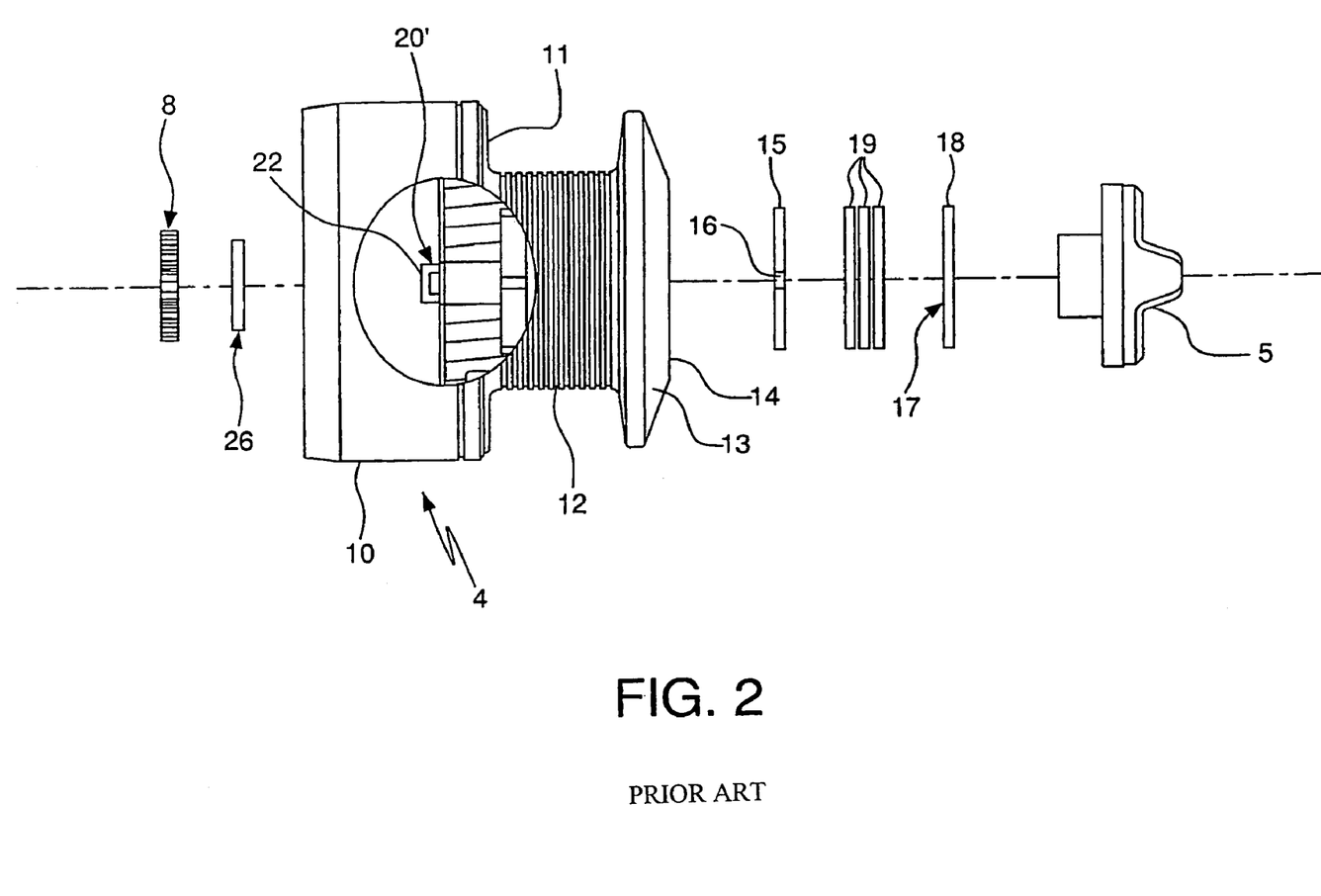
FIG. 2 is a side, perspective view of an exploded version of a spool from the prior art.

As shown in FIG. 2, spool 4 exhibits four discrete external features that include hollow rear skirt 10, rear flange 11 which structurally extends across the diameter of spool 4, central line reservoir section 12, and forward flange 13. Extending rearwardly through forward flange 13 and at least partially into line reservoir section 12 is drag stack chamber 14. Forward flange 13 is usually not integral with the other sections of spool 4 and is secured thereto with one or more screws tapped into the material thickness of line reservoir section 12 between its outer diameter and the inner diameter of drag stack chamber 14 to restrain washers within drag stack chamber 14.

Drag stack chamber 14 is conventionally formed with a substantially uniform diameter from top to bottom, apart from any surface features on its internal diameter that are used to interact with any external diameter features on a spool washer. In some cases, drag stack chamber 14 may include a step diameter increase for a relatively short distance at the top of the drag stack chamber of a length sufficient to accommodate the thickness of a retainer ring or washer with a diameter larger than washers in the drag stack.

Drag stack chamber 14 encloses a series of friction washers, one or more spool washers keyed into the inner diameter of the spool to prevent relative rotation to the spool and one or more spindle washers configured with a central opening that will engage the noncircular cross sectional shape of the spindle so as to avoid relative rotation to the spindle. For example, spool washer 15 is formed with an external projection 16 that will engage in a slot (not shown) that is formed into the wall of drag stack chamber 14 so as to structurally link spool washer 15 with spool 4 in a manner that prevents relative rotation between them. Spindle washer 17 is generally round with a diameter that is less than that of drag stack chamber 14 but which exhibits an axial opening 18 that is shaped to structurally engage the cross sectional shape of spindle 7 so as to prevent relative rotation therebetween. Between spool washer 15 and spindle washer 17 is one or more friction washers 19 that are generally round with an axial opening that does not engage spindle 7 but which are intended to provide adjustable levels of friction between themselves and the adjacent structurally engaged spindle washers 17. This adjustable level of friction provides the angler with a measure of protection for whatever strength line is used and the ability to fine tune the reel for various styles of fishing.

Enclosed by rear skirt 10 is the bottom surface 20 of rear flange 11 that bears on star wheel 8 which is, in turn, bearing on shoulder 9 formed into spindle 7. Star wheel washer 21 is disposed between star wheel 8 and bottom surface 20 and acts as a further friction washer when drag knob 5 is tightened onto spindle 7 to compress washers 15, 18, and 19.

The amount of frictional force that the drag function of the spool assembly can supply for a given compressive load is proportional to the number of friction washers in the spool assembly, the average diameter of the friction washers 19, and the compressive force applied by the drag knob. Given this design, the number of main friction washers 19 that may be used is limited to an odd number. Furthermore, the force applied by the drag knob passes through spool 4, star wheel washer 21, star wheel 8 and onto bearing shoulder 9 thereby creating stress in spool 8.

To ensure a smooth drag, the forward end of flange 13 upon which drag knob 5 presses and the bottom surface 20 of rear flange 11 must be parallel, or substantially parallel. This need for separated but parallel surfaces imposes certain precision constraints on the manufacturing of the spool. Consequently, the diameter of small friction washer 12 is often greatly reduced to decrease the effects of non-parallelism but also to reduce the power of the drag effects of this additional washer, e.g., 9 mm diameter as opposed to 19 mm diameter for a surface area ratio of about 1:20 (accounting for different central holes for the spindle).

It would be desirable to have a spinning reel that would maximize effective use of all friction washers to maximize the power of its drag system while also reducing the need for high precision in the alignment of separated, parallel bearing surfaces on a spool.

SUMMARY OF THE INVENTION

Accordingly, an objective of the invention is to provide a spinning reel with a drag system that avoids the use of a relatively small drag washer below the spool and which is designed to locate all drag washers within the drag stack chamber of the spool. This design will reduce the dimensional constraints on the spool size and increase the effective drag area of the reel drag system.

Another objective of the invention is to provide a fishing reel with a spool assembly that is mounted to its spindle wherein the spindle includes a keyed shape on the proximal end of the spindle washer, closest to the drag knob and a circular shape on the distal end of the spindle, furthest from the drag knob.

Still another objective of the invention is to provide a spool assembly comprising a spool that is radially and axially drivable by a spindle through at least one spindle washer and at least one spool washer that have one or more frictional drag washers therebetween, wherein the spindle washer is structurally keyed to the spindle and the spool washer is structurally keyed to the spool.

Yet another objective of the present invention is to provide a spool assembly having a plurality of spindle, friction, and spool washers for retarding the movement of the spool due to interacting structures on the washers and retaining ring that engage the interior of the spool.

The foregoing objectives, and others that will become apparent from the description herein, are attained by a spinning reel that includes:

(a) a body having a rotor assembly coupled to the main body for rotating about a central axis;

(b) a crank handle associated with the body for rotating the rotor assembly and oscillating a spindle that passes through the rotor assembly;

(c) a spool assembly disposed upon the spindle and defined by interacting surface features to interact with drag washers having corresponding and associatively interacting surface features whereby at least one spindle washer is structurally engaged with said spindle, at least one spool washer is structurally engaged to said spool assembly, and one or more friction washers are disposed therebetween; and (d) a drag knob assembly is connected to the spool assembly opposite the rotor assembly for adjusting friction among the washers.

By forming the spinning reel according to the invention, the spool assembly is only frictionally engaged with the spindle of the fishing reel by way of friction between and among the drag washers. There is no need for a small diameter drag washer below the spool between the bearing surface of the pawl mechanism. Elimination of this small drag washer enhances the effective frictional surface area of the drag stack that is available for controlling the rotation and counter-rotation of the spool assembly. The absence of the small drag washer also allows the spool to be designed to hold more fishing line because the torque effects of line tension further from the centerline axis of the spool are more readily accommodated with the larger drag washer diameters.

Other objects, advantages, and salient features of the present invention will become apparent from the following detailed description, which, taken in conjunction with the annexed drawings, discloses preferred embodiments of the invention.

BRIEF DESCRIPTION OF THE DRAWINGS

Referring to the drawings which form a part of this disclosure.

DETAILED DESCRIPTION OF THE INVENTION

As seen in the attached figures, a spinning reel according to the present invention includes a series of alternating frictional and structural washers that are axially constrained within a drag stack chamber and bearingly supported upon a shoulder formed within that chamber. A bushing extending through the bottom of the spool and into bearing contact with the star wheel. Inside the drag stack chamber, this bushing is in bearing contact with a spindle washer keyed to the rotation of the spindle by a suitable shaped center bore. An axially restricted spool washer is secured within the drag washer stack and is supported on a bearing shoulder formed within the drag stack chamber to support compression forces on the drag stack across a larger area and transfer those forces, by way of the bushing, directly to the star wheel. This configuration reduces distortion forces on the spool and allows the small star wheel washer to be eliminated in favor of adding a much larger, more effective friction washer within the drag stack chamber.

Figure 3:
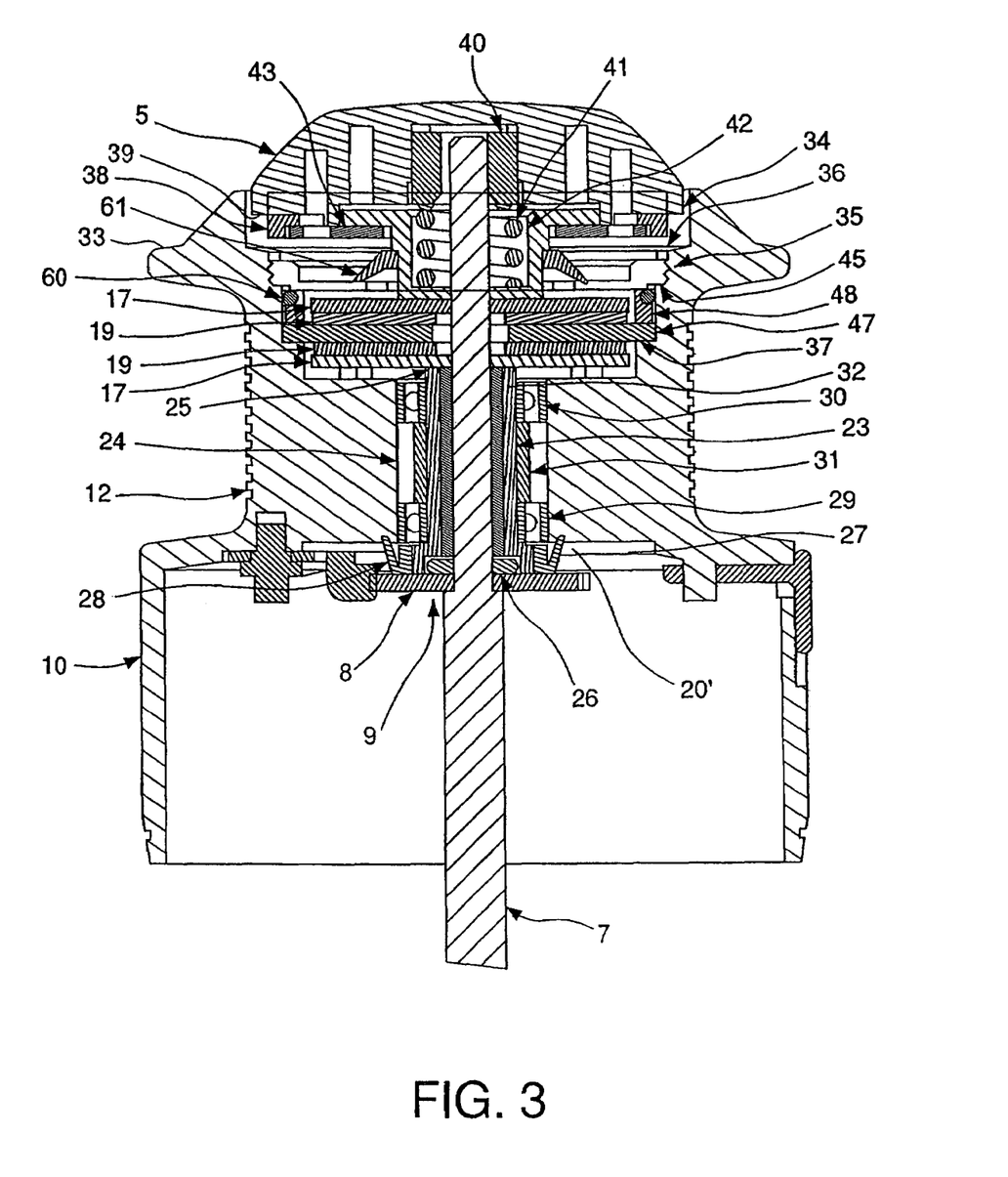
FIG. 3 is a side, elevation view in cross-section of the spool assembly taken along line 3-3 in FIG. 1.
Figure 4:
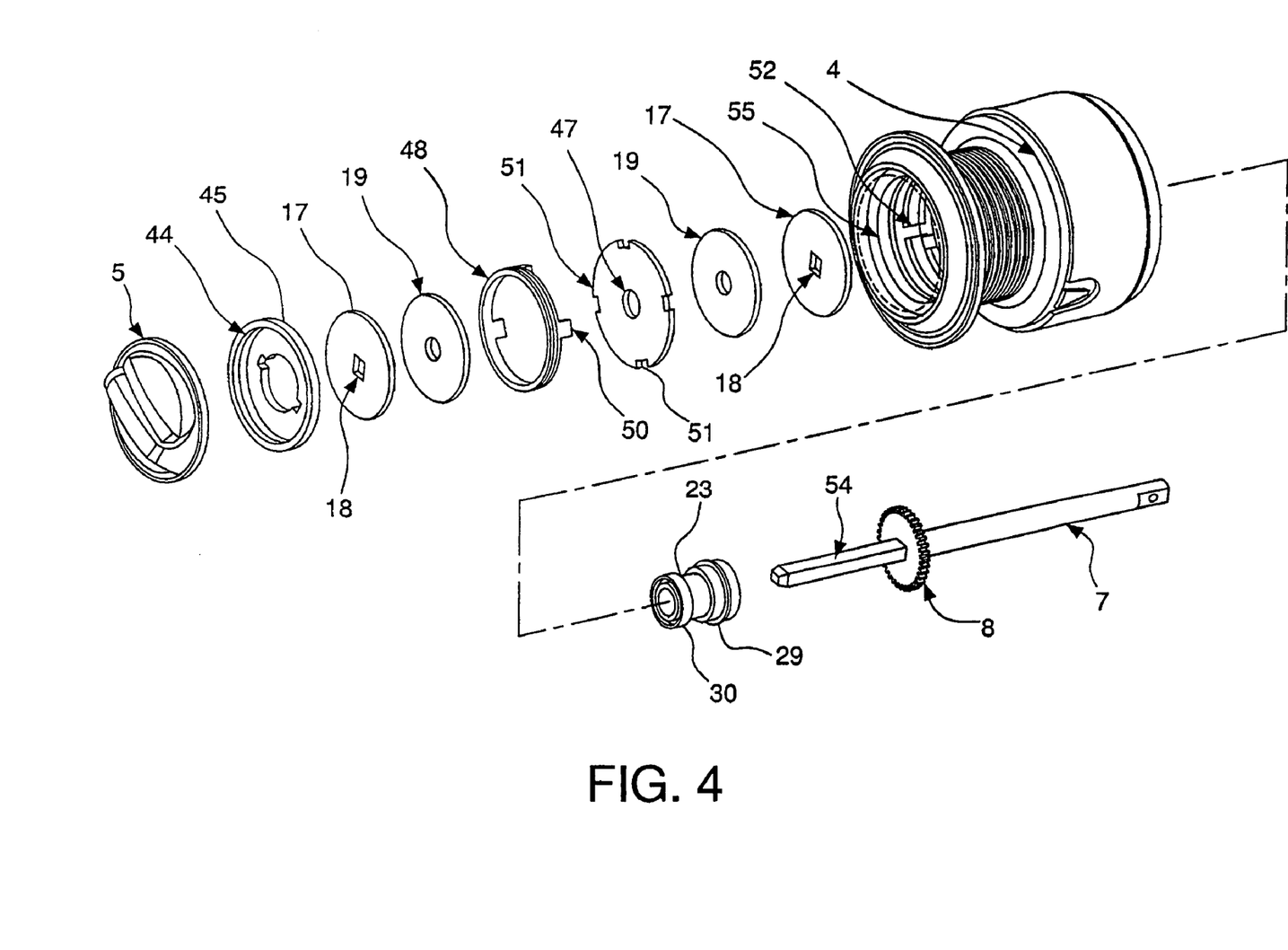
FIG. 4 is a side, perspective view of an exploded version of the spool assembly and drag knob assembly from FIG. 1.

Turning to the present invention disclosed in FIGS. 3 and 4, spindle 7 is a longitudinal shaft that projects axially through spool 4 into threaded engagement with drag knob 5. Spindle 7 exhibits shoulder 9 upon which star wheel 8 is axially supported. Behind shoulder 9 (towards crank handle 6), spindle 7 preferably exhibits a circular cross sectional shape and appropriate connections with crank handle 6 for oscillatory motion as rotor 3 revolves around spool 4.

Above shoulder 9 (towards drag knob 5), spindle 7 preferably exhibits a noncircular cross sectional shape that will enable structural engagement with one or more spindle washers in a manner that prevents relative rotation between them. Preferred cross sectional shapes for spindle 7 include square, triangular, and circular shapes with one or more flat lands such as those that can be formed by one or two flat surfaces into a round shaft.

Bushing 23 is axially supported on star wheel 8 and extends through central bore 24 in spool 4 between bottom surface 20' within rear skirt 10 and base 25 of drag stack chamber 14. First gasket 26 surrounds spindle 7 above star wheel 8 and abuts the inside diameter of bushing shoulder 27 to seal against debris and liquids that may enter the drag stack chamber 14 and cause potential fouling of the drag stack. Preferably, first gasket 26 fits tightly around spindle 7 so that it is frictionally held against spindle 7. Second gasket 28 can be disposed around the outer perimeter of bushing shoulder 27 for additional sealing protection against contaminants and liquids.

First and second rotation bearings 29, 30 are separated by axial spacer 31 and contact the inner walls of spool 4 along central bore 24 to facilitate smooth rotation of spool 4. As noted above, the configuration of the drag stack washers and design of the drag stack chamber remove a substantial amount of the axial load stresses on the reel so that the additional of rotation bearings provides an exceptionally smooth spool rotation. Retaining clip 32 axially secures rotation bearings 29, 30, and axial spacer 31 on bushing 23. Friction caused by the elasticity of first gasket 26 against the bushing 23 and spindle 7 maintains the bushing 23 against star wheel 8 when spool 4 is removed for maintenance or replacement, or for a new spool with a different fishing line wound thereupon. The drag stack portion 54 of spindle 7 that extends into spool 4 exhibits a cross sectional shape that engages the inside of bushing 23.

As illustrated in FIG. 3, spool 4 exhibits integrally formed forward flange 33. Spool 4 exhibits cap bore 34 and first step diameter 35 to form first and second shoulders 36, 37 within forward flange 33. The inside diameter of first step diameter 35 is desirably just slightly less than drag cap inner diameter 38 whereby drag cap shoulder 39 would abut spool shoulder 36 if drag cap 5 was advanced further down spindle 7 or jarred so as to incur relative axial displacement.

Drag cap 5 further includes drag nut 40 that engages threads on the forward end of spindle 7 and biases drag cap spring 41 against cap bottom 42 and against the drag washer stack. Drag knob cover 43 restrains cap bottom 42 against drag cap 5. Drag cap seal 61 can be used to protect the drag washer stack against infiltration by contaminants and liquids.

Figure 5:
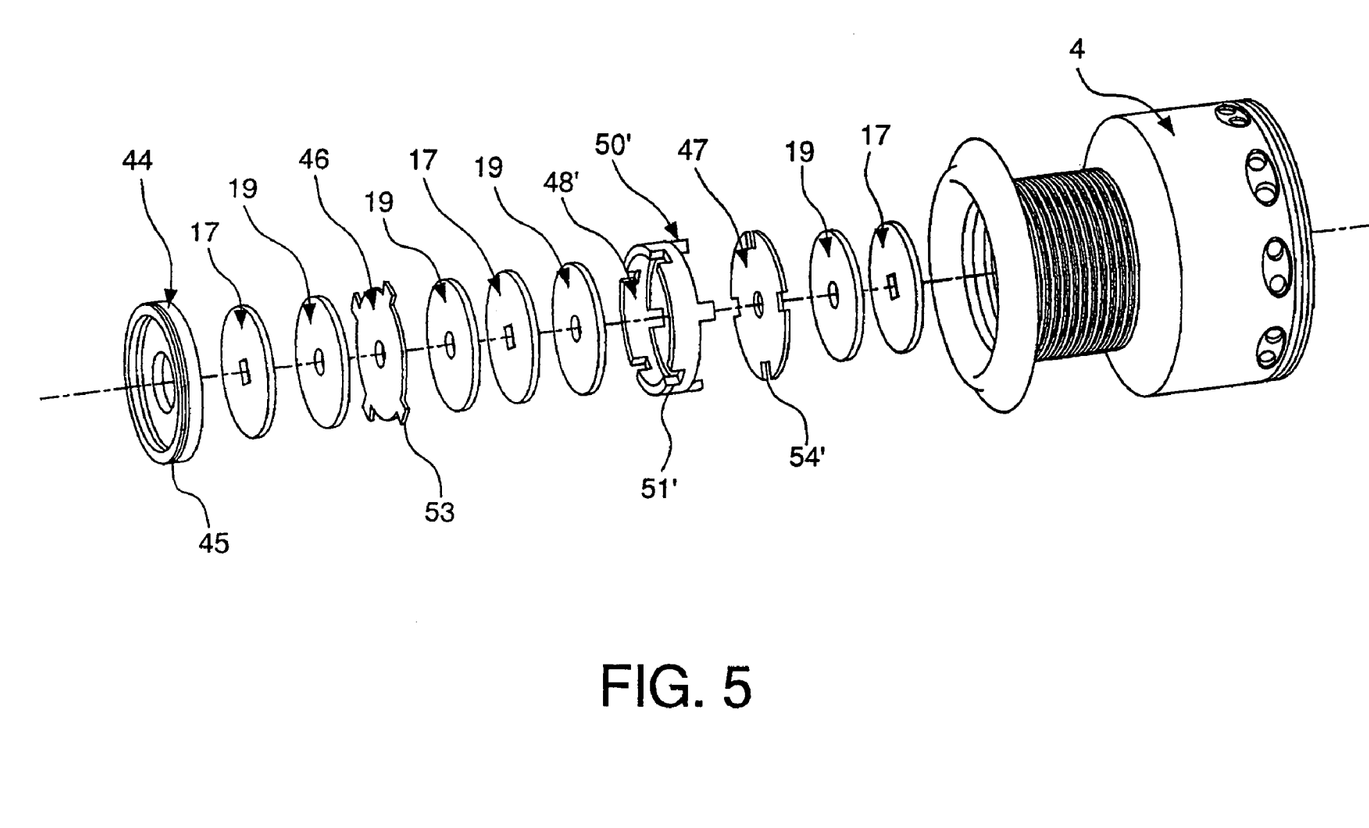
FIG. 5 is a side, perspective view of an exploded version of a spool assembly according to a second embodiment of the invention shown in FIG. 1.

As shown in exploded form in FIGS. 4 and 5, axial movement within drag stack chamber 14 is restrained on the top by spool cover 44 with externally formed threads 45 that engage threads 55' formed into the inside diameter of first step diameter 35 and abuts engaging ring 48 which abuts spool washer 47 axially constraining it against second shoulder 37.

Within drag stack chamber 14, spindle washers 17 that are structurally engaged with spindle 7 cooperate with spool washers 46, 47 that exhibit external surface features, such as radial projections 53 and radial slots 54' (FIG. 5) or radial slots 54 (FIG. 4), which structurally engage corresponding interior engagement surface features 52 of spool 4 so as to interact frictionally through a series of friction washers 19. As drag knob 5 is urged against the drag washer stack, the axial pressure provides an adjustable level of friction between them that resists rotation of spool 4 against the urging of spindle 7. Engaging ring 48, 48' is configured to interact with structural features, such as radially extending washer projection keys 53 and axially extending washer slots 54, 54' on at least one of spindle washers 46, 47, and optionally with an engageable spool cover 44' having mating engagement surface structures, such as axially extending cover projections 50' and cover slots 53' (FIG. 7), that will structurally enhance the mechanical connection among them to spool 4. Once these engagement features and spool cover 44 are fully engaged, the relative movement will be substantially eliminated between spool 4, 4' and spool washer 47, 47'. Seal 60 is preferably used to seal drag stack chamber 14 from foreign materials.

The preferred engaging surface features are substantially rectangular-shaped, axial projections that extend from the perimeter of engaging ring 48, 48'. A plurality of such features are preferably spaced evenly around the perimeter of engaging ring 48, 48'. Slots 51, 51' around the perimeter of spool washer 47, 47' engage projections 50, 50' extending from retaining ring 48, 48'. Preferably, slots 51, 51' exhibit a matingly rectangular shape.

Friction washer 19 and spindle washer 17 are positioned on either side of spool washer 47. They each contain an axial opening 18 that structurally engages the cross sectional shape of spindle 7. The keyed shape of axial opening 18 interacts with a corresponding noncircular cross sectional shape of the drag stack portion 54 of spindle 7 that extends into drag stack chamber 14 and prevents spindle washers 17 from rotating relative to spindle 7 within drag stack chamber 14. Friction washer 19 is located between every spool washer 46, 47 and spindle washer 17 to provide a controlled friction surface at each juncture but is not structurally engaged with either spool 4 or spindle 7.

The rear end of spindle washer 17, closest to the bushing 23, rests on the end surface 58 of bushing 23 such that when drag knob 5 applies an axial force, intervening washers 17, 19, 47 are all axially compressed between the drag knob 5 and bushing 23. The compressive force to spool washer 47 thereby axially constrains spool 4 which is fixedly engaged with spool washer 47. In such a manner, the diameter of the friction washers can be maximized while eliminating the aforementioned parallelism constraint on the spool.

Figure 6:
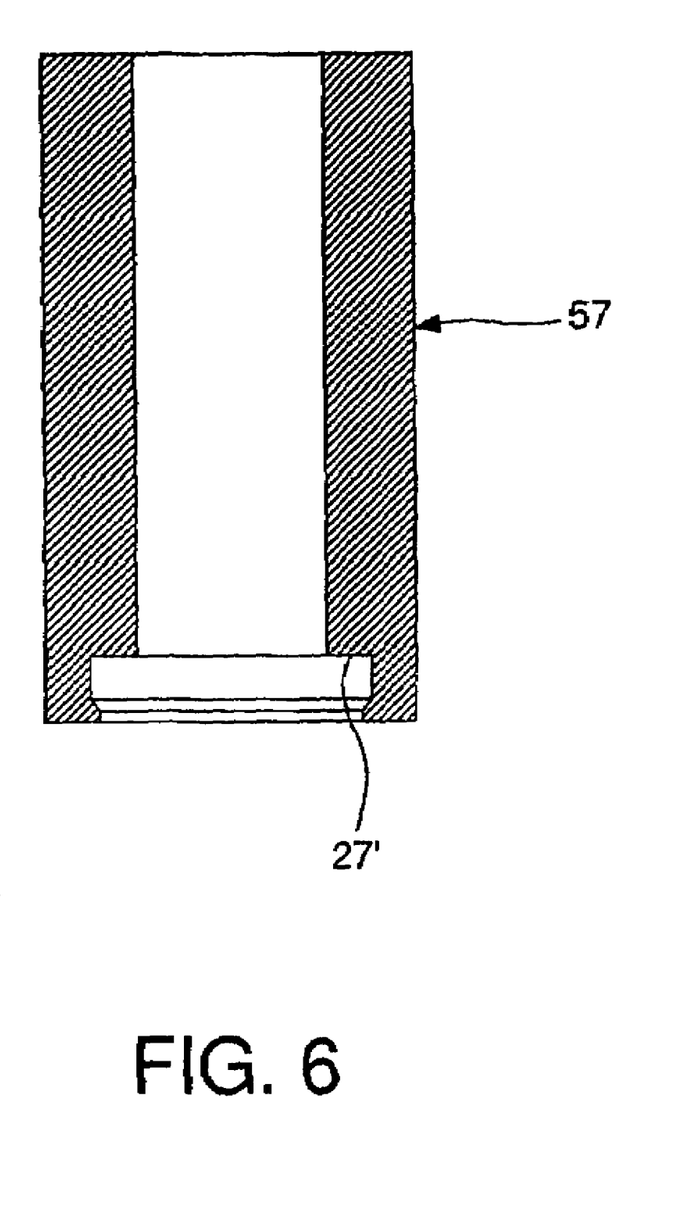
FIG. 6 is a side, elevation view in cross-section of a bushing.

The bearing assemblies 29, 30 are strategically placed for smoothness, support, and stability. It is possible to substitute the bearing assemblies 29, 30 for a simple bushing 57 assembly, as seen in FIG. 6.

Turning to FIG. 5, in a second embodiment, engaging ring 48' exhibits projections 50' and slots 51, both are preferably rectangular as shown, for engaging spool washers 46, 47' and spaced equally.

Figure 7:
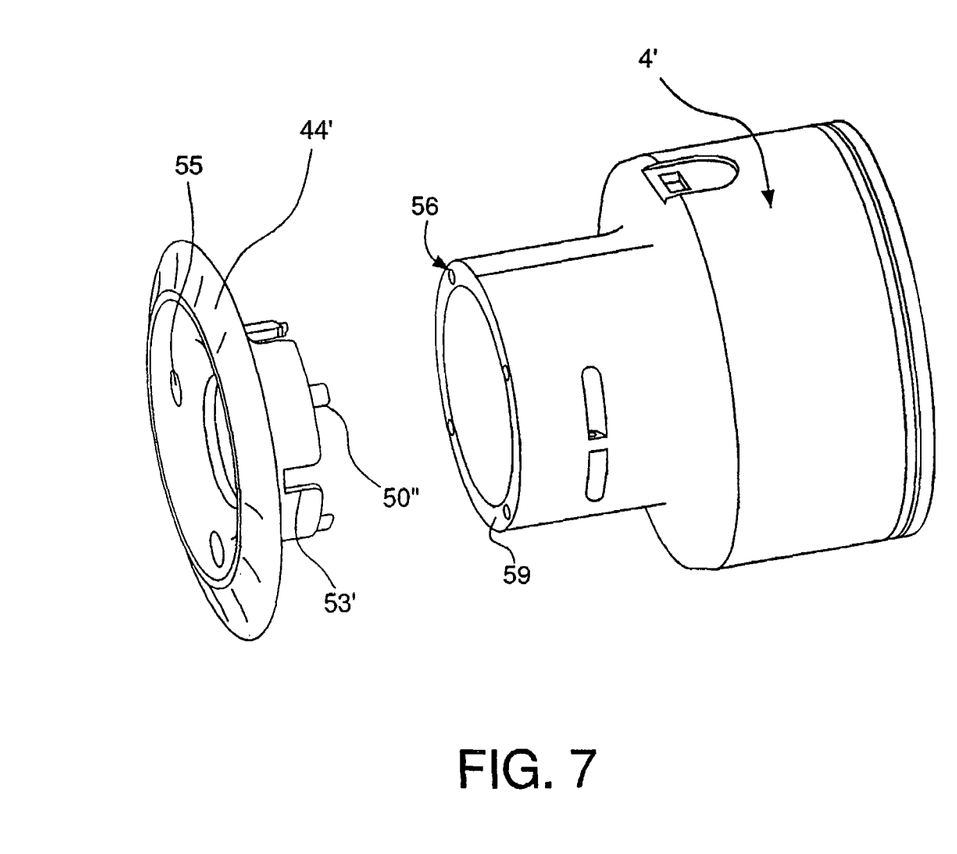
FIG. 7 is a side, perspective view of a spool assembly according to a third embodiment of the invention shown in FIG. 1.

In a third embodiment of the present invention, referred to in FIG. 7, the engaging ring and the front spool flange are integrally formed in spool cover 44'. Spool cover 44' exhibits projections 50" for structurally engaging spool washer 47' and thru holes 55. Spool 4' exhibits threaded receivers 56 that are disposed substantially uniformly around rim 59 of spool 4'. Spool cover 44' is attached to spool 4' using fasteners, such as bolts, that engage cover 44', extend through thru holes 54 and into threaded receivers 56.

While a particular embodiment has been chosen to illustrate the invention, it will be understood by those skilled in the art that various changes and modifications can be made therein without departing from the scope of the invention as defined in the appended claims.

What is claimed is:

1. A spinning reel comprising:
a body having a rotor assembly coupled to said body for rotating about a central axis;
a spindle passing through said rotor assembly;
a crank handle connected to said body for rotating said rotor assembly and oscillating said spindle;
a spool assembly disposed about said spindle and comprising a spool having an outer portion adapted to store a fishing line and an inner portion forming a drag stack chamber, said spool having a first spool washer fixedly engaged therewith and located within said drag stack chamber whereby said spool washer is axially restrained;
at least one spindle washer within said drag stack chamber that is structurally engaged with said spindle by an interacting structural surface feature on said spindle washer that engages a corresponding surface feature on said spindle; and
a drag knob assembly connected to said spindle and adapted to control frictional resistance exerted axially along said spindle among washers disposed in said drag stack chamber.

2. A spinning reel according to claim 1, wherein
said spindle further includes a spindle washer separating said spindle into a forward portion and a rearward portion, said forward portion is further defined by a cross sectional shape for structurally engaging said spindle washer, and said rearward portion includes a substantially circular shape.

3. A spinning reel according to claim 2, wherein
the corresponding structural feature of said spindle is a cross sectional shape is substantially rectangular.

4. A spinning reel according to claim 2, further comprising:
a bushing assembly around said spindle that extends from a star wheel positioned at the rear of said spool and into said drag stack chamber.

5. A spinning reel according to claim 4, further comprising:
a bearing assembly supported on said bushing and which bearingly, rotatably supports said spool so as to allow relative rotation between said spool and said spindle apart from frictional forces exerted by washers in said drag stack chamber.

6. A spinning reel according to claim 4, wherein
said bushing assembly comprises an elastic gasket that fits around said spindle.

7. A spinning reel according to claim 6, wherein
said spool assembly further includes a central bore shaped to radially constrain said bushing assembly within said spool assembly.

8. A spinning reel according to claim 1, further comprising:
an engaging ring located in said drag stack chamber and which non-rotatably engages said spool washer.

9. A spinning reel according to claim 8, wherein
said engaging ring exhibits external threads that mate with threads on an inside surface of said spool that is located in said drag stack chamber.

10. A spinning reel according to claim 8, wherein
said engaging ring exhibits a plurality of axially extending projections around said engaging ring.

11. A spinning reel according to claim 10, wherein
said projections engage said spool washer that is rendered relatively non-rotatable relative to said spool by engagement with said projections.

12. A spinning reel according to claim 8, further comprising:
a second spool washer that also structurally engages said engaging ring and at least one spindle washer disposed between said first and second spool washers.

13. A spinning reel according to claim 12, further comprising:
at least one friction washer disposed between said first and second spool washers, respectively, and said spindle washer.

14. A spinning reel according to claim 1, further comprising:
a spool cover that exhibits a plurality of axially extending projections that engage said first spool washer and render said first spool washer relatively non-rotatable relative to said spool by engagement with said projections.

* * * * *